United States Patent Office 3,024,830
Patented Mar. 13, 1962

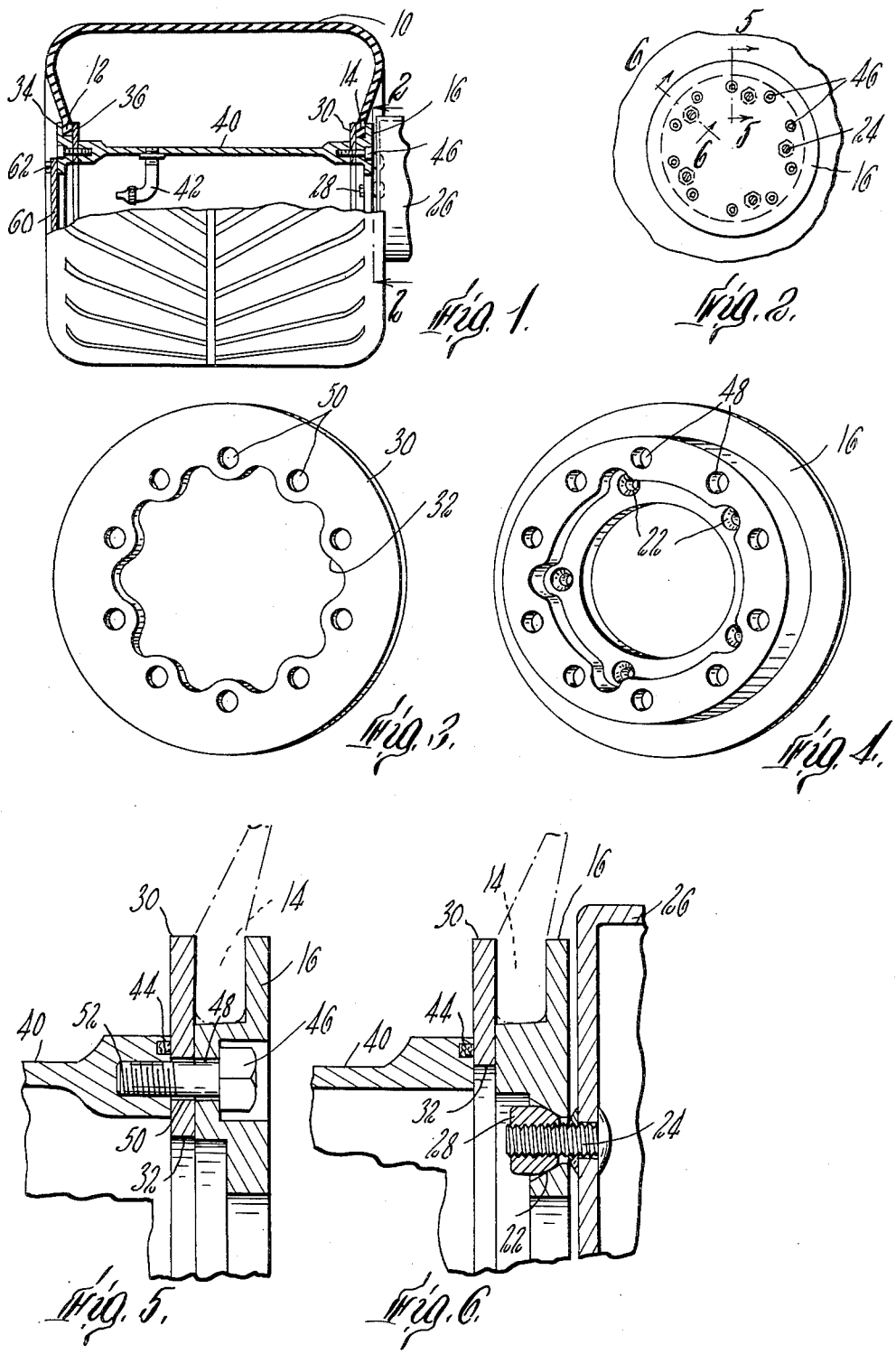

3,024,830
PNEUMATIC TIRE MOUNTING DEVICE
Joseph W. Bowersox, Carmel, Calif., assignor to Terra Engineering Company, Inc., Carmel, Calif., a corporation of Delaware
Substituted for abandoned application Ser. No. 796,117, Feb. 27, 1959. This application Apr. 20, 1960, Ser. No. 23,521
2 Claims. (Cl. 152—396)

This invention relates to a device for mounting wide-base tires on vehicles and pertains more specifically to such a device adapted to be mounted on a vehicle in place of conventional wheels.

There have been developed wide-base, low-pressure tires which provide improved support and traction for vehicles in soft or sandy soil or in snow with reduced resistance to rolling and consequently reduced power requirements for the vehicle. While they may contain inner tubes, they are preferably tubeless, being sealed to the mounting device to form an air-tight chamber. Such tires, because of their wide base and wide profile, cannot be mounted on conventional vehicle wheels, so that their use, despite obvious advantages, has been impeded by the necessity for manufacturing vehicles with special hub and axle assemblies designed to accept such tires.

One object of the present invention is to provide a device for mounting such tires which is adapted to be mounted on a vehicle in place of a conventional wheel.

Another object is to provide a tire-mounting device of the type described which is of simple and inexpensive construction and on which such a tire can readily be mounted in air-tight relation.

Still another object is to provide a tire-mounting device of the type described in which both beads of the tire are clamped to the device in air-tight relation and in which the device forms an air-tight chamber with the tire.

A further object is to provide a device of the type described composed of a plurality of parts of such size and configuration that those which are to be disposed within the interior of the tire can readily be introduced past the beads without the necessity for using any tools or special equipment and which can readily be assembled in place to form an air-tight enclosure with the tire.

A further object is to provide a device of the type described in which the clamping force exerted against the beads of the tire is balanced against the force employed to seal the several parts of the device in air-tight relation with each other.

Other and further objects will be apparent from the drawing and from the description which follows.

In the drawings:

FIG. 1 is a view in side elevation, partly broken away and in section, showing one embodiment of my device carrying a tire mounted in position on a vehicle;

FIG. 2 is an end view of my device taken along line 2—2 of FIG. 1;

FIG. 3 is an isometric view showing one of the bead-retaining flanges of the embodiment shown in FIG. 1;

FIG. 4 is an isometric view of another bead-retaining flange of the embodiment shown in FIG. 1, the flange of FIG. 4 being adapted to mate with the flange of FIG. 3;

FIG. 5 is a view in cross section on an enlarged scale taken along line 5—5 of FIG. 2; and FIG. 6 is a view in cross section on an enlarged scale taken along line 6—6 of FIG. 2.

As appears from FIG. 1 of the drawing, the device of the present invention is intended for use with a tubeless pneumatic tire 10 having a wide low profile with the beads 12, 14 widely spaced from each other. In general, tires of this type have a tread width at least one-half as great as the overall tire diameter. Such tires provide a much greater area of tread in contact with the ground than do tires of normal profile, thus reducing greatly the load on each unit area of the ground over which the tire passes. Such tires can operate at much lower inflation pressure than normal tires, even as low as 2 p.s.i. or even lower pressures being possible. While pressures as high as 20 p.s.i. or even 30 p.s.i. or more may be employed in such tires, they are usually not required; and the preferred pressures normally range from 2 p.s.i. to about 20 p.s.i.

The device of the present invention on which such tires may be mounted comprises a rigid annular bead-retaining flange 16 provided with an opening in its center and having a circle or ring of lug holes 22, 22 of such size and spacing that flange 16 is adapted to be mounted on the threaded wheel lugs 24 of a conventional hub 26 in place of a conventional wheel. Holes 22, 22 are countersunk to receive conventional conical wheel lug nuts 28 (see FIG. 6). A second rigid bead-retaining flange 30 is also provided with a central aperture 32 and mates with flange 16 in face-to-face abutting relation to form an annular channel in which the inboard bead portion 14 of tire 10 is clamped in hermetically sealed, air-tight relation, as best shown in FIGS. 5 and 6.

A second pair of mating rigid bead-retaining flanges 34, 36 is provided for clamping the outboard bead portion 12 of tire 10. Flanges 34, 36 may be and preferably are identical with flanges 16 and 30 respectively, so that they may readily be interchanged with each other. It is not essential, however, that flange 34 be provided with lug holes 22, 22, and if desired this flange may differ from flange 16 in omitting such holes.

A spacer member 40 in the form of an open-ended, hollow, tubular element having an imperforate, generally cylindrical wall is provided for maintaining flanges 16, 30 and flanges 34, 36 in the desired spaced relationship. A conventional air valve 42 for inflating and deflating tire 10 is mounted in the cylindrical wall of spacer 40 and extends into the hollow interior thereof. Flanges 30, 36 are arranged to abut against the opposing ends of spacer member 40, a rubber O-ring 44 being mounted in an annular channel in each end of spacer member 40, as shown in FIGS. 5 and 6, to provide an air-tight seal between each end of spacer member 40 and the bead-retaining flanges 30, 36. The flanges and spacer member are preferably made of steel, aluminum alloy or other strong rigid material. Bolts 46, 46 extending through mating holes 48, 48, 50, 50 in the bead-retaining flanges are threadedly engaged in tapped holes 52, 52 in the ends of spacer member 40, as shown in FIG. 5. Each O-ring 44 is arranged to surround the circle of bolts 46 so that the bolts are sealed from the air chamber formed by the tire when it is mounted in place. Since flanges 30 and 36 are interposed between the ends of spacer member 40 and the corresponding outermost flanges 16, 34, it will be clear that as bolts 46, 46 are tightened, the sealing force exerted between flange 30 and O-ring 44 is exactly balanced by the sealing clamping force applied to the bead 14 of the tire by the opposing faces of flanges 30, 16. Similarly, the sealing force between flange 36 and its opposing O-ring is balanced by the force applied to bead 12 by flanges 34, 36. Thus there is ensured at one operation an adequate air-tight seal both between the tire and the bead-engaging flanges and between both pairs of flanges and the spacer member 40. A cover plate 60 may be secured over the central aperture of outermost flange 34 by bolts 62.

In mounting a tire upon the device, no tools or special equipment other than a wrench is required. Although the bead portion of such tires, like the beads of all other tires, are inextensible, being provided with a steel core or grommet, the bead can readily be distorted to an oval shape manually, thus permitting introduction into the interior of the tire of flanges 30, 36 along with spacer member 40. One outermost flange, such as flange 16, is then applied to the outside of tire bead portion 14 and aligned with flange 30 and with spacer member 40, whereupon bolts 46, 46 are screwed into place. In the same way, outermost flange 34 is mounted at the opposite end of spacer member 40 and both pairs of flanges are tightened by means of bolts 46, 46 to clamp bead portions 12, 14 of the tire in air-tight relation to the flanges and at the same time to seal the flanges against the ends of spacer member 40 by compressing O-rings 44. The entire assembly may then be mounted on hub 26 in the same manner as an ordinary wheel. The wheel lugs 24, 24 are accessible through the interior of hollow spacer member 40 for this operation. Cover plate 60 may be removably secured in place over the central aperture of outer bead-retaining flange 34 by means of bolts 62 if desired. Tire 10 may be inflated through valve 42 either before or after mounting of the assembly on hub 26, cover plate 60 being removable to permit access to valve 42 for this purpose.

Although specific embodiments of the invention have been described herein, it is not intended to limit the invention solely thereto, but to include all of the obvious variations and modifications within the spirit and scope of the appended claims.

What is claimed is:

1. A device for mounting a wide-base tubeless tire on a vehicle comprising a hollow open-ended tubular member having an imperforate wall provided with a tire-inflating valve extending into the interior of said member, a first annular bead-engaging flange disposed at each end of said tubular member in abutting relation thereto, a second annular bead-engaging flange disposed beyond each of the first said flanges in abutting relation thereto, said flanges forming at each end of said tubular member an annular bead-receiving channel within which the beads of said tire are adapted to be clamped in airtight relation and having aligned central apertures opening into the interior of said tubular member to provide access to said inflating valve, sealing means forming an air-tight seal between each end of said tubular member and each of said first flanges, and meas for securing said flanges to said tubular member, the outermost flange at one end of said tubular member being adapted to be mounted on a hub in place of a conventional wheel.

2. A device as defined in claim 1 in which said securing means comprises means for urging the outermost flange at each end of said tubular member toward the end of said member with the other flange interposed between the end of said member and said outermost flange, and said sealing means comprises a compressible element interposed between the end of said tubular member and said other flange, whereby the clamping force applied to said tire bead is balanced by the sealing force applied to said compressible sealing element.

References Cited in the file of this patent
UNITED STATES PATENTS

| | | |
|---|---|---|
| 1,257,413 | Sloper | Feb. 26, 1918 |
| 1,842,219 | Trautman | Jan. 19, 1932 |
| 2,548,190 | Arpin | Apr. 10, 1951 |